United States Patent Office 3,749,590
Patented July 31, 1973

3,749,590
AMINE TREATMENT OF SULFONATED PHTHALOCYANINES
Daniel Walter Thomas, Bridgewater, and Vito Albert Giambalvo, Middlesex, N.J., assignors to American Cyanamid Company, Stamford, Conn.
No Drawing. Filed Mar. 1, 1971, Ser. No. 119,965
Int. Cl. C08h 17/14
U.S. Cl. 106—288 Q                          12 Claims

ABSTRACT OF THE DISCLOSURE

A copper phthalocyanine pigment which is useful in a wide variety of vehicle formulations is prepared by treating a partially sulfonated copper phthalocyanine, which may contain red or green shade unsulfonated copper phthalocyanine together with the sulfonated copper phthalocyanine, with a primary, secondary or tertiary alkyl amine having a total of from about 4 to about 12 carbon atoms in the alkyl group or groups in an aqueous medium at a temperature between about 20° C. and about 100° C.

BRIEF SUMMARY OF THE INVENTION

This invention relates to an improved sulfonated phthalocyanine pigment blend which has been subjected to treatment with an alkyl amine.

Blue colored copper phthalocyanine pigments are an important class of commercial pigments used in many applications in paints, enamels, printing inks, etc. Certain requirements must be met to give good results in various vehicle systems. Certain copper phthalocyanine pigments, both green shade and red shade, are especially useful in printing ink formulations; however there is a wide variation in commercial printing ink vehicle formulations. Desirably, the copper phthalocyanine pigment should retain its preferred characteristics regardless of the type of printing ink vehicle.

In many prior instances, those pigments which gave good results in one printing ink composition show definite deficiencies when used in other ink formulations, in, for example, strength of color, gloss, transparency, clarity, both by reflected and transmitted light, storage stability, flocculation and crystallization resistance, and convenience of use, such as ease of dispersability.

U.S. Pat. 2,187,816, Hartmann and Moll, January 1940, shows the treatment of more highly sulfonated copper phthalocyanines with amines such as cyclohexylamine and dodecylamine.

U.S. Pat. 2,699,442, Eastes and Cooke, January 1955, shows treating an unsulfonated copper phthalocyanine in the red shade form with octadecylamine or laurylamine.

U.S. Pat. 2,526,345, Giambalvo, October 1950, shows a blend of 5 to 40% sulfonated copper phthalocyanine monosulfonic acid and from 95 to 60% unsulfonated copper phthalocyanine. This would be about 0.04 to 0.4 sulphonic acid groups per copper phthalocyanine molecule.

U.S. Pat. 2,315,870, Nadler, Wegler and Bayer, April 1943, shows treating copper phthalocyanine sulphonic acid chloride with an alkylamine which is an isoalkylamine of about 15 carbon atoms.

The present invention is based on the discovery of a copper phthalocyanine pigment composition which is useful in a wide variety of ink formulations, with no loss or minimal loss in desirable properties.

The new pigment compositions are prepared by treating a partially sulfonated copper phthalocyanine with an alkyl amine containing 4 to 12 carbon atoms. Amines are preferable which have a boiling point below about 180° C.

The copper phthalocyanine pigment composition resulting from the amine treatment should be sulfonated to the extent that it contains from about 0.03 to about 0.18 sulfonic acid groups per phthalocyanine molecule. A range of 0.08 to 0.10 is generally preferable for best results. The process involving the treatment with amine is preferably carried out in an aqueous medium at a temperature between about 20° C. and 100° C. A preferred range is from about 75–85° C.

In some instances, further heating may be carried out to remove excess amine.

In order to obtain the amine treated sulfonated phthalocyanine composition of the invention, a phthalocyanine having from 0.03 to 1.5 sulfonic acid groups per phthalocyanine molecule is treated with the amine. However, when the phthalocyanine which has been treated has a sulfonic acid content of more than 0.18 sulfonic acid group per molecule, the treated phthalocyanine is then blended with sufficient unsulfonated phthalocyanine to give the phthalocyanine composition having from 0.03 to 0.18 sulfonic acid groups per molecule. Also the more highly sulfonated copper phthalocyanine may be blended with unsulfonated copper phthalocyanine before the amine treatment.

To obtain the sulfonated phthalocyanine for the amine treatment, the copper phthalocyanine may be directly sulfonated by known methods, for example, the reaction of the copper phthalocyanine with oleum in sulfuric acid. The sulfonation may be carried out to such an extent that the resultant phthalocyanine contains from about 0.03 to 1.5 sulfonic acid groups per phthalocyanine molecule. However, it is expedient, since better sulfonation control can be achieved, to sulfonate to the extent that about 0.25 to about 1.5 sulfonic acid groups per molecule results. Or more conveniently, the copper phthalocyanine may be sulfonated to an average sulfonic acid content from about 0.4 to 0.8 sulfonic acid groups per molecule by heating copper phthalocyanine with 100.5% sulfonic acid at about 92° C. for the required amount of time. This is blended back during processing.

Direct sulfonation of phthalocyanine is not practical if a green shade phthalocyanine is desirable since the acid based procedure in the direct sulfonation results in the red shade form.

Conveniently, with either a red shade or a green shade phthalocyanine the more highly sulfonated product may then be blended with unsulfonated green shade or red shade phthalocyanine or a mixture thereof to give a copper phthalocyanine composition with the desired sulfonic acid content.

Sulfonation to a greater degree than desired in the final product, and then blending with unsulfonated phthalocyanine to give the composition with the desired sulfonic acid content is applicable for both the red shade and the green shade product. Sulfonation of the phthalocyanine to a higher degree of sulfonated followed by blending with unsulfonated product also allows more accurate control of the sulfonic acid content, and reduces the quantity that must be treated in the sulfonating step.

The sulfonated phthalocyanine used for the composition of the invention is conveniently obtained by the sulfonation process using oleum. However, a sulfonated phthalocyanine resulting from the use of a sulfonated starting material used in the original synthesis of the phthalocyanine is also suitable. Thus, for example, in the preparation of copper phthalocyanine via the well known phthalic acid-urea method, a phthalic acid based starting material containing sulfonic acid radicals when used in the synthesis will result in sulfonated phthalocyanines. The proportion of the sulfonic acid substituted starting material used will determine the extent of sulfonation in the final material.

For the amine treatment, alkyl and cycloalkyl amines containing from 4 to 12 carbon atoms are used. Those having a boiling point below 180° C. are preferred.

Amines suitable for the practice of the invention include:

|   | B.P., ° C. |
|---|---|
| n-Butylamine | 76–78 |
| t-Butylamine | 44–45 |
| n-Hexylamine | 128–131 |
| Cyclohexylamine | 133–135 |
| 2-ethylhexylamine | 168–169 |
| n-Octylamine | 178–179 |
| Di-n-butylamine | 159–161 |
| Di-isobutylamine | 139–140 |
| Triethylamine | 88–90 |
| Tributylamine | 216–217 |
| n-Dodecylamine | 258–259 |

Mixtures also give good results. A preferred amine is t-octyl amine (1,1,3,3-tetramethylbutyl amine) B.P. 137–143° C. For the amine treatment, from about 2 to 15 percent amine based on the total mixture by weight is suitable. More amine may be used but no substantial improvement results, and the use of increased amounts is not economically advantageous.

In the amine treatment, the amount of water used is not critical except that sufficient should be used to result in a stirrable fluid mass. Generally, however, at least 10 parts of water are used per part of the phthalocyanine; at least about 15 parts is preferred. Greater proportions of water may be used, but this requires larger tanks, etc. The temperature used for the amine treatment ranges from about 20 to about 100° C. A temperature of about 75° to 80° C. is preferred. At this latter temperature the treatment may be completed in from about one to two hours.

Longer holding may be used when convenient in operating schedules.

During the period of heating, the bulk of free amine may be removed through evaporation or distillation. Removal of the amine is normally carried out for several reasons. Thus, the presence of excess amine in the product may result in an undesirable odor. The excess amine may be removed and condensed for later reuse.

A certain amount of amine is retained in the product, part of which may form a salt with the sulfonic acid group and part of which may be physically absorbed or otherwise held on the surface. As shown in one of the examples which follow, if unsulfonated phthalocyanine is given a similar amine treatment, a certain amount of the amine is retained so that the treated composition contains about 0.39% amine. The amine treated sulfonated products normally contain from about 0.5% to about 10% amine depending in part on whether all of the excess amine is removed.

A large excess of amine may affect the working properties of the solvent ink system in which the product is used. The excess amine can be removed to give desired properties. For instance an excess amine can give a higher viscosity in some rotogravure inks, which may or may not be desired by the printer.

For the amine treatment, the original unsulfonated phthalocyanine may be blended in the form of a presscake with a sulfonated phthalocyanine presscake, followed by adding the amine to this mixture (referred to as in situ method). Alternatively the two products in dry form may first be dry blended and then added to an aqueous system containing the amine.

Alternatively also, the unsulfonated phthalocyanine and the sulfonated phthalocyanine either in dry powder or presscake form may separately be given the amine treatment and amine treated products blended in proportions suitable to result in a product with the desired sulfonic acid content, either as a presscake or in dry form. Either one of the components may be in dry powder form and blended with the other in presscake form.

Although preferred for optimum results, it is not necessary to subject both the sulfonated and unsulfonated copper phthalocyanine products used for blending to the amine treatment. Substantial improvement results if at least the sulfonated phthalocyanine which is blended is given the amine treatment. Thus, for dry blending operations, the sulfonated phthalocyanine may be amine treated and the dried product blended with unsulfonated phthalocyanine which has not undergone the amine treatment.

Obviously the final product must be of pigmentary size to function as a pigment. Most of the material must have a particle size smaller than 0.5 microns. Usually, but not necessarily, the copper phthalocyanine is reduced to pigmentary size before the amine treatment. It can be treated first, and then ground or milled to pigmentary size, but size reduction is usually more conveniently accomplished before the amine treatment.

Similarly, lower and higher sulfonated copper phthalocyanine pigments may be blended and amine treated in any order, but economically procedures using fewer components and less handling are preferred.

The amine treated products are especially useful in various types of solvent ink systems such as rotogravure or flexographic inks. Thus, evaluation in the various types of ink systems show that the improved products give good results; generally the good results are not limited to only certain ink systems. Examples of standard ink compositions include those known as rotogravure type C vehicle and cosolvent polyamide flexigraphic ink.

The treated and improved products of the invention show superior characteristics over a more highly sulfonated phthalocyanine product which has been given an analogous amine treatment. Thus the improvement in the properties in the various ink systems with respect to greater strength, gloss, transparency, clarity, etc. is unique to the composition of the invention within the proportions here described.

The invention is further illustrated by the following examples in which parts are by weight, unless otherwise clearly set forth.

EXAMPLE 1

Sulfonation

To 412 parts of 100.5% $H_2SO_4$ is added at 25° C., 30 parts of copper phthalocyanine, and the mixture is slowly heated to 92° C. and held there 1.5 hours. The thus formed solution is cooled to 55° C. and 60 parts of xylene are added. After 0.5 hours at 55° C., the solution is poured into 4000 parts of water, forming a slurry which is heated to 70–75° C. and filtered. The product is washed essentially sulfuric acid free with water, resulting in 160 parts of presscake which contains 32 parts of a solid product having an average composition of $$CuPc(SO_3H)_{0.47}.$$

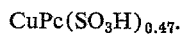

(0.47 mol sulfonate group per mol of copper phthalocyanine.)

EXAMPLE 2

In situ amine treatment

A mixture of 12 parts of sulfonated phthalocyanine presscake from Example 1 (2.4 parts solids), 36.4 parts of green-shade presscake (10.9 parts solids), 1.2 parts of t-octylamine and 210 parts of water are vigorously agitated until all solids are well dispersed. The resulting mixture is heated to 80° C. for 2 hours with stirring. The product is filtered, washed and dried to give 13.6 parts of phthalocyanine product. The pigment is crushed in a mill such as a fixed or swinging hammer mill.

The product here has an average of 0.085 sulfonic acid groups per phthalocyanine molecule. The product shows an amine content of 1.2%.

The above procedure is also applicable using the red-shade phthalocyanine instead of the green shade product.

An excellent red-shade phthalocyanine pigment is obtained.

EXAMPLE 3

Comparative evaluation

The following tables show the results of tests with copper phthalocyanine pigments having various sulfonic acid group assays and treated with an amine. Comparable data are shown for copper phthalocyanine which had no amine treatment; with copper phthalocyanine having no sulfonic acid group content but treated with amine; and an amine treated copper phthalocyanine which was sulfonated outside the ranges specified.

The pigments were incorporated in two different ink formulations. Comparisons were made on the basis of color, strength, gloss and transparency on aluminum foil and gloss and transparency on cellulose acetate film.

The procedures used were:

(A) Preparation of amine treated pigment with high sulfonic acid content (0.55)

To a slurry of 250 g. sulfonated copper phthalocyanine, sulfonated similarly to Example 1, in presscake form containing 52.5 g. real sulfonated copper phthalocyanine with average 0.55 sulfonic acid groups per molecule, in 400 ml. water was added 105 g. t-octylamine and the resulting slurry was stirred 22 hours at room temperature. Excess t-octyl amine was removed by steam distillation and the product was isolated by filtering hot and drying at 90° C. The product had an amine content of 5.76%.

(B) Preparation of amine treated pigment with a sulfonic acid content of 0.26 g. sulfonic acid groups per molecule A slurry of 250 g. sulfonated copper phthalocyanine in presscake form, 62.0 g. real, with an average of 0.26 sulfonic acid groups per molecule was dispersed in 800 ml. water by a high shear stirring device (such as is available commercially as an Eppenbach Homomixer), 5.4 g. t-octylamine was added, and the mixture further dispersed for 5 minutes. The volume was adjusted to 1200 ml. with water, gradually heated to 75° C. and held at 75–80° C. for 1 hour. The slurry was filtered hot, washed with water and dried to give 63.4 g. product. This product had an amine content of 2.35%.

(C) Preparation of amine treated pigment with no sulfonic acid content

A mixture of 520 g. green-shade copper phthalocyanine presscake (150 g. real) was dispersed in 2000 ml. water using an Eppenbach Homomixer and 16.5 g. t-octylamine was added. The slurry was further dispersed for 5 to 10 minutes and after adjusting the volume to 2700 ml. with water, the mixture was heated gradually to 75° C. and held at 75–80° C. for one hour. The slurry was filtered hot and the isolated product dried at about 90° C. This product had an amine content of 0.39%.

(D) Preparation of amine treated pigment with 0.047 sulfonic acid groups per molecule A thoroughly dispersed slurry of 43.5 g. sulfonated copper phthalocyanine presscake, 10.8 g. solids, 0.26 sulfonic acid group assay; 164 g. green shade copper phthalocyanine presscake, 49.2 g. solids; and 5.4 g. t-octylamine in 1200 ml. water was stirred and gradually heated to 75–80° C. and held there for one hour. The product was filtered, washed and dried, giving 62.4 g. of product with a sulfonic acid assay of 0.047.

(E) Preparation of amine treated pigment with 0.07 sulfonic acid groups per molecule A procedure similar to that above in C was applied except that 65.4 g. of the sulfonated copper phthalocyanine, wet presscake, 16.2 g. solids, and 146 g. green shade copper phthalocyanine wet presscake, 43.8 g. solids, were substituted for the analogous components giving 61.7 g. of product with a sulfonic acid assay of 0.070. This product had an amine content of 1.04%.

(F) Preparation of amine treated pigment with 0.094 sulfonic acid groups per molecule A procedure similar to that above in D was used except that 87 g. of the sulfonated copper phthalocyanine, wet presscake, 21.6 g. solids, and 128 g. green shade copper phthalocyanine wet presscake, 38.4 g. solids, were substituted for the analogous components giving 62.0 g. of product with a sulfonic acid assay of 0.094. This product had an amine content of 1.27%.

(G) Co-solvent polyamide ink evaluation

The pigments were made up in a cosolvent polyamide vehicle of the following composition.

|  | G. |
|---|---|
| Polyamide resin (Versamid Resin 940) | 600 |
| Iso-propyl alcohol | 660 |
| Mineral spirits (Skellysolve "B") | 440 |

The composition was rolled in a ½ gallon jar for several hours until a solution formed.

Ink formulations were then prepared by milling 15 g. pigment, 85 g. composite vehicle and 500 g. ⅛" steel balls for 24 hours, at 120 r.p.m. in an 8 oz. jar. The resulting inks were displayed using a No. 5 or 6 round laboratory coating rod on paper backed aluminum foil and on cellulose acetate film.

For tinting evaluations, compositions are prepared using $TiO_2$ (Unitane OR–580).

100 g. of composite vehicle, as above, containing 100 g. $TiO_2$ was rolled with berylite ceramic balls 18 to 20 hours in a pint sized mill and 15 g. of this white was weighed with 1 g. blue base ink above into a 2 oz. bottle, and then shaken 15 min. on a paint shaker. The resulting tint was drawn down on aluminum foil with a No. 8 round laboratory coating rod.

(H) Rotogravure type C ink evaluation

The composite vehicle was prepared by milling the following

|  | G. |
|---|---|
| Dibutyl phthalate | 4.5 |
| ¼" SS nitrocotton (70% real, ethyl alcohol wet) | 22.7 |
| Ethyl acetate | 22.7 |
| Ethyl alcohol | 79.7 |
| Isopropyl alcohol | 6.7 | until a complete solution was formed. Ink formulations were prepared by milling 28.6 g. pigment, 136.3 g. composite vehicle, and 1000 g. ¼" steel balls in a 16 oz. jar sealed with plastic film for 16 hours at 88±5 r.p.m. The jar was opened, 13.6 g. of ethyl alcohol added, the jar resealed and milled again for 24 hours.

The jar was again opened, 30.8 g. ethyl alcohol and 20.0 g. ethylcellosolve added, and the sealed container again milled for 30 minutes and discharged.

Displays were prepared with this masstone ink using a No. 6 round laboratory coating rod on paper-backed aluminum foil and on clear cellulose acetate film.

A type C white tint base composite for making tinting strength and tint tone evaluations was prepared by charging to a 0.42 gal. porcelain mill:

|  | G. |
|---|---|
| Type C vehicle as prepared above | 315.0 |
| $TiO_2$ (Unitane OR–580) | 472.0 |
| ½" Berylite balls | 1500.0 |

This was ground 16–18 hours. Then there were added:

|  | G. |
|---|---|
| Type C vehicle | 305.2 |
| Ethyl Cellosolve | 87.8 |

The mixture was ground an additional hour and discharged.

The tinting ink for evaluation was prepared by using 124 parts Type C white tinting base above and 4.0 parts of phthalocyanine Blue Rotogravure Type C ink to yield a tint ratio of 1:99; this was placed upon a Red Devil shaker for 15 minutes and prepared as drawdowns with No. 8 round laboratory coating rod on paper backed aluminum foil.

The above procedures were repeated using red-shade copper phthalocyanine instead of green shade copper phthalocyanine, where shown in the table.

Observations on comparison as to strength, gloss, shade are shown in the following table.

TABLE I

Cu Phthalocyanine in Rotogravure Type C Ink Composition—with green shade Cu Phthalocyanine (In situ preparations where applicable)

| Product description | Color shade on foil | Gloss on foil | Transparency on foil | Gloss on film | Transparency on film | Tint shade | Tint strength |
|---|---|---|---|---|---|---|---|
| Green shade, no treatment. (1). | Greenish shade of blue-dull finish. | Poor | Poor | Poor | Poor | Dull light greenish blue. | Weak. |
| Amine treated (no sulfonation). (2). | Slightly greener shade of blue still dull. | do | Poor. Slight improvement over (1). | do | do | Dull light greenish blue slight improvement over (1). | Slightly stronger than (1). |
| Amine treated 0.26 sulfonation. (3). | Similar to (2) above but duller. | Very poor | Very poor | Very poor | Very poor | Dull light greenish blue and grayer duller than (2) above. | Stronger and bluer than (2) above. |
| Amine treated 0.047 sulfonation (Ex. 3-D). (4). | Clean bright greenish shade of blue. | Excellent | Excellent | Excellent | Excellent | Clean bright blue. | Much stronger than any of (1), (2), or (3). |
| Amine treated 0.07 sulfonation (Ex. 3-E). (5). | Similar to (4) above. | do | do | do | do | Similar to (4) above. | Somewhat stronger than (4) above. |
| Amine treated 0.094 sulfonation (Ex. 3-F). (6). | do | do | do | do | do | Similar to (4) and (5) above. | Slightly stronger than (5) above. |
| Amine treated 0.085 sulfonation (Ex. 2). (7). | do | do | do | do | do | do | Similar to (4) and (5) above. |
| Amine treated 0.55 sulfonation (Ex. 3-A). (8). | Slightly greener shade of blue than (3) above. | Poor | Poor | Poor | Poor | More greenish blue than (3) above. | Weaker in strength than (3) above. |
| Amine treated 0.10 sulfonation.[1] (9). | Similar to (4) above. | Excellent | Excellent | Excellent | Excellent | Similar to (4) and (5) above. | Similar to (4) and (5) above. |
| Amine treated 0.10 sulfonation.[2] (10). | do | do | do | do | do | Similar to (4), (5) and (9) above. | Similar to (4), (5) and (9) above. |

[1] Dry blend process; amine treated high sulfonation product blended with non-amine treated phthalocyanine.
[2] Dry blend process; amine treated high sulfonation product blended with amine treated phthalocyanine.

TABLE II

Cu Phthalocyanine in Rotogravure Type C Ink Composition—with red shade Cu Phthalocyanine

| Product description | Color shade on foil | Gloss on foil | Transparency on foil | Gloss on film | Transparency on film | Tint shade | Tint strength |
|---|---|---|---|---|---|---|---|
| Red shade, no treatment. (1). | Reddish shade of blue dull finish. | Poor | Poor | Poor | Poor | Dull light slightly reddish shade blue. | Fairly good. |
| Amine treated, no sulfonation. (2). | | | | | | | |
| Amine treated 0.55 sulfonation. (3). | Slightly reddish shade of finish. | Poor | Poor | Poor | Poor | Light blue shade. | Fair. |
| Sulfonation 0.10 no amine treatment.[1] (4). | Similar to (1) above. | do | do | Poor but very slight improvement over (1) above. | do | Similar to (1) above. | Similar to (1) above. |
| Amine treated 0.10 sulfonation.[1] (5). | Clean reddish shade of blue. | Excellent | Excellent | Excellent | Excellent | Clean slightly reddish shade of blue. | Much stronger than (1), (3) or (4) above. |
| Amine treated 0.10 sulfonation.[2] (6). | do | do | do | do | do | do | Much stronger than (1), (3) or (4) above similar to (5) above. |
| Amine treated 0.066 sulfonation.[2] (7). | do | do | do | do | do | do | Much stronger than (1), (3) above similar to (5) above. |

For footnotes 1 and 2, see end of Table I.

TABLE III

Cu Phthalocyanine in Cosolvent Polyamid Flexographic Ink Composition—with Green shade Cu Phthalocyanine

| Product description | Color shade on foil | Gloss on foil | Transparency on foil | Gloss on film | Transparency on film | Tint shade | Tint strength |
|---|---|---|---|---|---|---|---|
| Green shade no treatment. (1). | Green shade of blue. | Poor | Poor | Fairly poor | Fairly poor | Light greenish shade of blue. | Fairly strong. |
| Amine treated no sulfonation. (2). | Similar to (1) above. | Very slightly better than (1) above but still poor. | Very slightly better than (1) above but still poor. | Poor | Fair | Similar to (1) above. | Slightly weaker than (1) above. |
| Amine treated 0.26 sulfonation. (3). | More reddish shade of blue than (1) above. | Very poor | Very poor | do | Very poor | More reddish shade of blue. | Stronger than (1) above. |
| Amine treated 0.55 sulfonation. (4). | Similar to (3) above. | Very poor, worse than (3) above. | Very poor, worse than (3) above. | do | Very poor, worse than (3) above. | More greenish shade of light blue than (3) above. | Weaker than (3) above. |
| Amine treated 0.09 sulfonation.[1] (5). | Green shade of blue. | Excellent | Excellent | Excellent | Excellent | Greenish shade of light blue. | Much stronger than (2), (3) or (4) above. |
| Amine treated 0.085 sulfonation.[2] (6). | do | do | do | do | do | do | Do. |

[1] Dry blend process.  [2] In situ process.

The results in the tables demonstrate the preferred characteristics of ink compositions using pigments of this invention in contrast to results using copper phthalocyanines, unsulfonated and with no amine treatment; unsulfonated but with an amine treatment; sulfonated but without an amine treatment; and amine treated with sulfonation to a degree outside the defined claimed range of sulfonation.

EXAMPLE 4

Amine treated—0.097 sulfonic acid groups

A mixture of 197 parts of sulfonated copper phthalocyanine wet presscake with an average of 0.64 sulfonic acid groups per molecule, 33.6 parts solids; 642 parts of green shade phthalocyanine wet presscake, 188 parts solids; and 20 parts of t-octylamine in 3200 parts of water was vigorously agitated until all the solids were well blended. The mixture was heated to 95° C. and held for 6 hours, during which time excess amine was removed by an air jet exhaust. The product was filtered, washed and dried to give 219 parts of phthalocyanine containing 0.097 sulfonic acid groups per molecule. A product with properties similar to that obtained above in Example 2 resulted.

EXAMPLE 5

Amine treated 0.085 sulfonic from 1.25 sulfonic by blending

A thoroughly dispersed slurry of 38.4 g. of sulfonated copper phthalocyanine presscake, 4.1 g. of solids with 1.25 sulfonic acid groups assay; 186 g. of green shade copper phthalocyanine presscake, 55.9 g. solids and 4.5 g. of t-octyl amine in 1200 ml. water was stirred and gradually heated to 75° C. The slurry was held at 75–80° C. for about one hour. The product was filtered, washed and dried, giving 61 g. of product with a sulfonic acid content of 0.085. This product has properties similar to those materials obtained using the procedure described in Example 4.

EXAMPLE 6

Pigment with 0.15 sulfonic groups

A thoroughly blended slurry of 89.5 g. sulfonated copper phthalocyanine presscake, 14.1 solids, and a 0.64 sulfonic acid assay; 153 g. of green shade copper phthalocyanine presscake, 46.0 g. solids; and 5.4 g. t-octyl amine in 1200 ml. water was stirred and heated to 75° C. and held at 75–80° C. for 1 hour. The product was filtered, washed and dried giving 62.1 g. of product containing 0.15 sulfonic acid groups per molecule.

EXAMPLE 7

Variations of amines

A mixture of 49.2 g. real copper phthalocyanine (164 g. presscake) and 10.8 g. real sulfonated copper phthalocyanine (0.55 sulfonic acid groups/molecule) (51.5 g. presscake) in 600 cc. water is thoroughly dispersed using an Eppenbach Homomixer; 5.4 g. t-octylamine is added, the mixture thoroughly dispersed and the volume adjusted to 1200 cc. with water. The mixture is stirred and heated to 75° C. over 25 minutes. The slurry is held at 75–80° C. for one hour (for volatile amines or 2 hours for non-volatile amines) and the hot slurry filtered, washed with 500 cc. water and oven dried at 90° C.

The procedure shown above was applied using a variety of amines:

| | |
|---|---|
| n-Butylamine | n-Dodecylamine |
| t-Butylamine | Di-n-butylamine |
| n-Hexylamine | Di-isobutylamine |
| 2-Ethylhexylamine | Triethylamine |
| n-Octylamine | Tributylamine |

In each instance, a pigment composition of improved properties was obtained compared with the similar product which had no amine treatment or with the unsulfonated product, with or without amine treatment.

Theoretically, one amine molecule reacts with each sulfonic acid group. In pigmentary form, some sulfonic groups may not be available for reaction because they are deep inside a solid particle, and also some amine may be physically absorbed on the pigment particles. The amount of amine used for treatment is more easily measured, than the amount retained. An excess of amine can cause odor problems, and can affect the vehicle. About 0.35% to 8% amine by weight in the final pigment gives the desirable results of this invention. 0.5 to 3% by weight is preferred.

We claim:

1. A process for the preparation of copper phthalocyanine pigment sulfonated to the extent of about 0.03 to about 0.18 sulfonic acid groups per copper phthalocyanine molecule which comprises treating a pigmentary copper phthalocyanine having from about 0.03 to about 1.5 sufonic acid groups per phthalocyanine molecule with an alkyl amine having a total of from about 4 to about 12 carbon atoms in an aqueous medium at a temperature of about 20° C. to about 100° C., and if the amine treated phthalocyanine has a sulfonic acid content of more than about 0.18 sulfonic acid groups per phthalocyanine molecule, blending the amine treated phthalocyanine with sufficient unsulfonated phthalocyanine to give a phthalocyanine composition having about 0.03 to about 0.18 sulfonic acid groups per phthalocyanine molecule.

2. The process of claim 1 where the unsulfonated copper phthalocyanine which is blended has been treated with an alkyl amine having a total of from about 4 to about 12 carbon atoms in an aqueous medium at a temperature of about 20° C. to about 100° C.

3. The process of claim 1 which comprises: treating a partially sulfonated copper phthalocyanine containing from 0.03 to 0.18 sulfonic acid groups per phthalocyanine molecule, with an alkyl amine having a total of from 4 to 12 carbon atoms in an aqueous medium at a temperature of about 20° C. to about 100° C.

4. The process of claim 1 in which the partially sulfonated copper phthalocyanine is prepared by blending unsulfonated copper phthalocyanine with a sulfonated copper phthalocyanine to give a mixture having 0.03 to 0.18 sulfonic acid groups per molecule of copper phthalocyanine.

5. The process of claim 1 wherein 2 to 15% alkyl amine is used based on the weight of copper phthalocyanine pigment in the final product.

6. The process of claim 1 in which the amine is 1,1,3,3-tetramethylbutyl amine.

7. The process of claim 4 in which at least part of the copper phthalocyanine is green shade copper phthalocyanine blended with a sulfonated copper phthalocyanine.

8. The process of claim 4 in which red shade copper phthalocyanine is blended with the sulfonated copper phthalocyanine.

9. The process of claim 4 in which the blending is carried out between dry, partially sulfonated copper phthalocyanine and dry unsulfonated copper phthalocyanine to give a partially sulfonated mixture prior to the amine treatment in the process aqueous medium.

10. The process of claim 4 in which the blending is carried out in the aqueous medium prior to adding the amine in the same aqueous medium.

11. A readily dispersible copper phthalocyanine pigment consisting essentially of copper phthalocyanine sulfonated to between about 0.03 and about 0.18 sulfonic acid groups per copper phthalocyanine molecule, in pigmentary size and form, having on the surface of the particles thereof, a coating of alkyl amine having from 4 to 12 carbon atoms total.

12. The pigment of claim 11 in which the total amine present is from about 0.35% to 8% by weight.

References Cited
UNITED STATES PATENTS

| | | | |
|---|---|---|---|
| 2,212,924 | 8/1940 | Muehlbauer | 106—288 Q |
| 2,799,594 | 7/1957 | Ehrich | 106—288 Q |

JAMES E. POER, Primary Examiner

U.S. Cl. X.R.

106—308 N